United States Patent
Guida et al.

(10) Patent No.: US 6,560,385 B2
(45) Date of Patent: May 6, 2003

(54) FIBER OPTIC PRISM COUPLER, COUPLING ARRANGEMENT AND FABRICATION METHOD

(75) Inventors: Renato Guida, Wynantskill, NY (US); Matthew Christian Nielsen, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/681,715

(22) Filed: May 24, 2001

(65) Prior Publication Data

US 2002/0176664 A1 Nov. 28, 2002

(51) Int. Cl.$^7$ ................................................ G02B 6/34
(52) U.S. Cl. .......................... 385/36; 385/31; 359/834; 359/837
(58) Field of Search ..................... 385/31, 36; 359/834, 359/837

(56) References Cited

U.S. PATENT DOCUMENTS 3,791,715 A * 2/1974 Lean et al. ................... 385/31
5,546,373 A * 8/1996 Koyama ...................... 359/638
5,771,328 A * 6/1998 Wortman et al. .............. 349/62
6,385,355 B1 * 5/2002 Nashimoto et al. ......... 385/129

OTHER PUBLICATIONS

D. J. Sterling, Jr. "Fiber Optics", The Optical Fiber, Chapter 5, pp. 46 & 47, and Fiber–Optic Cables, Chapter 7, pp. 70 & 71, 1987.

* cited by examiner

Primary Examiner—Robert H. Kim
Assistant Examiner—Richard Kim
(74) Attorney, Agent, or Firm—Ann M. Agosti; Patrick K. Patnode

(57) ABSTRACT

An optical coupler comprises a fiber optic prism (FOP) comprising first, second, and third side surfaces, the FOP being adapted to receive light through the first side surface, reflect the received light from the third side surface, and transmit the reflected light through the second side surface. The FOP may be used in an optical coupling arrangement comprising a substrate including a light element and a wave guide overlying the substrate, with the optical being situated such that one of the first and second side surfaces is adjacent the light element and the other of the first and second side surfaces is adjacent the wave guide.

22 Claims, 3 Drawing Sheets

US 6,560,385 B2

FIBER OPTIC PRISM COUPLER, COUPLING ARRANGEMENT AND FABRICATION METHOD

BACKGROUND OF INVENTION

The invention relates generally to optical coupling.

In many integrated photonic advanced processing applications, orthogonally coupling of light from different components remains a significant challenge. For example, in some embodiments vertical cavity surface emitting lasers (VCSELs) embedded in flat multi-chip modules (MCMs) need to be coupled to a wave guide, and in other embodiments the light needs to be coupled from wave guides fabricated on a flat surface to an orthogonal direction through a supporting substrate.

One technique for orthogonal coupling is to position a prism with surfaces adjacent the emitting and receiving elements. Conventional prisms are expensive to fabricate due to the small size (a 2 millimeter by 2 millimeter prism can be fabricated for about $100.00, for example). Additionally, conventional prisms are difficult to handle especially when positioning and aligning to the two elements.

Another technique for orthogonal coupling by machining a forty-five degree mirror into the end of a wave guide, for example, can be difficult to achieve, even in multi-mode wave guide embodiments wherein the wave guides thicknesses are on the order of about 20 microns to about 50 microns, and can be even more difficult to achieve in single mode wave guide embodiments wherein the thickness are typically about 2 microns to about 6 microns. Mirror machining becomes unstable due to the geometrical dimensions.

Still another technique for orthogonal coupling is using a flexible wave guide loop wherein the wave guide extends substantially straight from the substrate and gradually curves downward until the remainder of the wave guide is flat on the surface of the substrate. This technique is not compatible with embodiments wherein planar technologies must be used.

SUMMARY OF INVENTION

It would therefore be desirable to provide a structure for coupling of light from a wave guide to an embedded light element.

Briefly, in accordance with one embodiment of the present invention, an optical coupler comprises a fiber optic prism (FOP) comprising first, second, and third side surfaces, the FOP being adapted to receive light through the first side surface, reflect the received light from the third side surface, and transmit the reflected light through the second side surface.

In accordance with another embodiment of the present invention, an optical coupling arrangement comprises: a substrate including a light element; a wave guide overlying the substrate; and a fiber optic prism (FOP) comprising first, second, and third side surfaces, the FOP being adapted to receive light through the first side surface, reflect the received light from the third side surface, and transmit the reflected light through the second side surface, the FOP being situated such that one of the first and second side surfaces is adjacent the light element and the other of the first and second side surfaces is adjacent the wave guide.

BRIEF DESCRIPTION OF DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION

Figure 1:
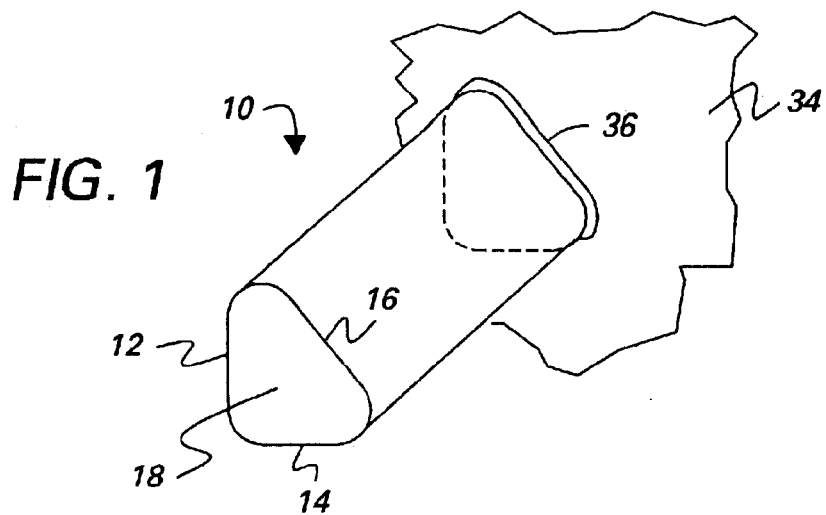
FIG. 1 is a partial perspective view of a fiber optic prism (FOP) being drawn from a fiber fabrication apparatus according to one embodiment of the present invention.

FIG. 1 is a partial perspective view of a fiber optic prism (FOP) 10 being drawn from a fiber fabrication apparatus 34 according to one embodiment of the present invention.

Figure 3:
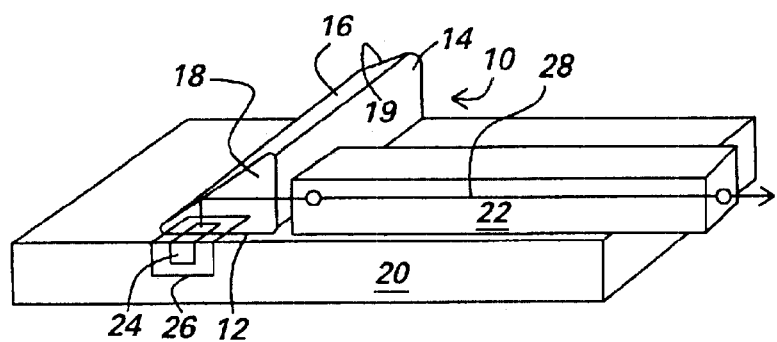
FIG. 3 is a partially perspective and partially sectional view of an optical coupling arrangement using the FOP shown in FIG. 1 in accordance with a coupling embodiment of the present invention.

According to one embodiment of the present invention, an optical coupler comprises an FOP comprising first, second, and third side surfaces 12, 14, and 16 and first and second end faces 18 and 19 (end face 19 is shown in FIG. 3) with the FOP being adapted to receive light through the first side surface, reflect the received light from the third side surface, and transmit the reflected light through the second side surface. The FOP may be fabricated to have a predetermined length for a specific application or an "infinite" or indefinite length as in an example wherein an FOP is wound around a dispensing spool (not shown) and has an initial length of about 1–4 kilometers.

Most optical fibers have round cross-sectional shapes and include cores surrounded by cladding with some additionally including jackets. For this application only the core material is essential, although one or more outer layers can be useful in optimizing the optical path.

Rather than drawing the FOPs from a conventional fiber fabrication apparatus with a round hole, a fiber fabrication apparatus of the present invention has a specially shaped hole 36 to provide the first, second, and third side surfaces. The FOP may comprise any desired size and is expected to commonly comprise sides having lengths ranging from about 20 micrometers to about 5 millimeters, for example. Typically optical fibers are drawn from a material such as quartz or a plastic. By controlling the index of refraction and the angle of the third side surface with respect to the substrate, the direction of light travel can be further optimized.

Unlike conventional prisms, FOPs are inexpensive and do not require extra polishing. FOPs can be drawn to a desired shape, are automatically smooth, and can be cut to any length. Ease of alignment of the FOP is proportional to the length of the FOP. For ease of aligning short FOPs (having lengths less than about 5 millimeters, for example), it may be advantageous to position a longer FOP and then cut or otherwise remove extraneous portions. Additionally, having the first and second side surfaces be in close contact with a prefabricated structure, can facilitate alignment.

In the embodiment of FIG. 1, FOP 10 is shaped such that the first, second, and third side surfaces 12, 14, and 16 each comprise substantially flat surfaces. Substantially flat is used herein to mean at least about 80 percent of the surface is flat. For ease of drawing the FOPs, adjacent portions of the side surfaces can be curved. Again, the FOP (meaning either the core or the core and one or more outer layers) can be fabricated to provide an index of refraction optimized for a specific application.

Figure 2:
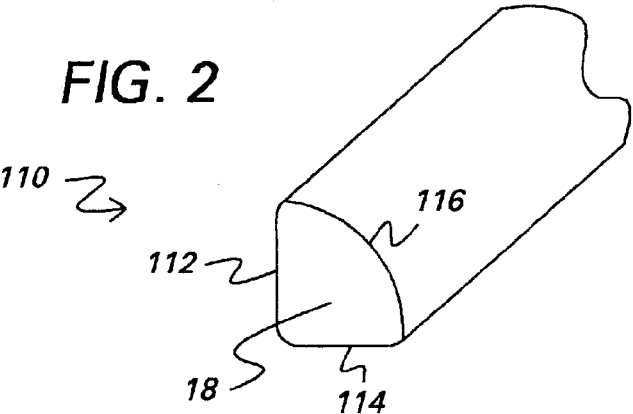
FIG. 2 is a partial perspective view of an FOP according to another embodiment of the present invention.

FIG. 2 is a partial perspective view of an FOP 110 according to another embodiment of the present invention wherein the first and second side surfaces 112 and 114 each comprise substantially flat surfaces and the third side surface comprises a substantially curved surface. Substantially curved is used herein to mean at least about 80 percent of the surface has a constant radius.

Figure 5:
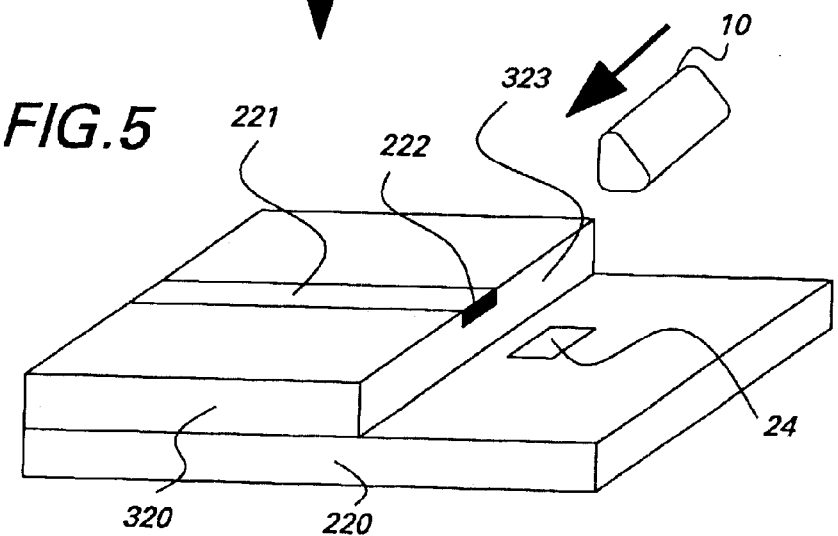
Figure 7:
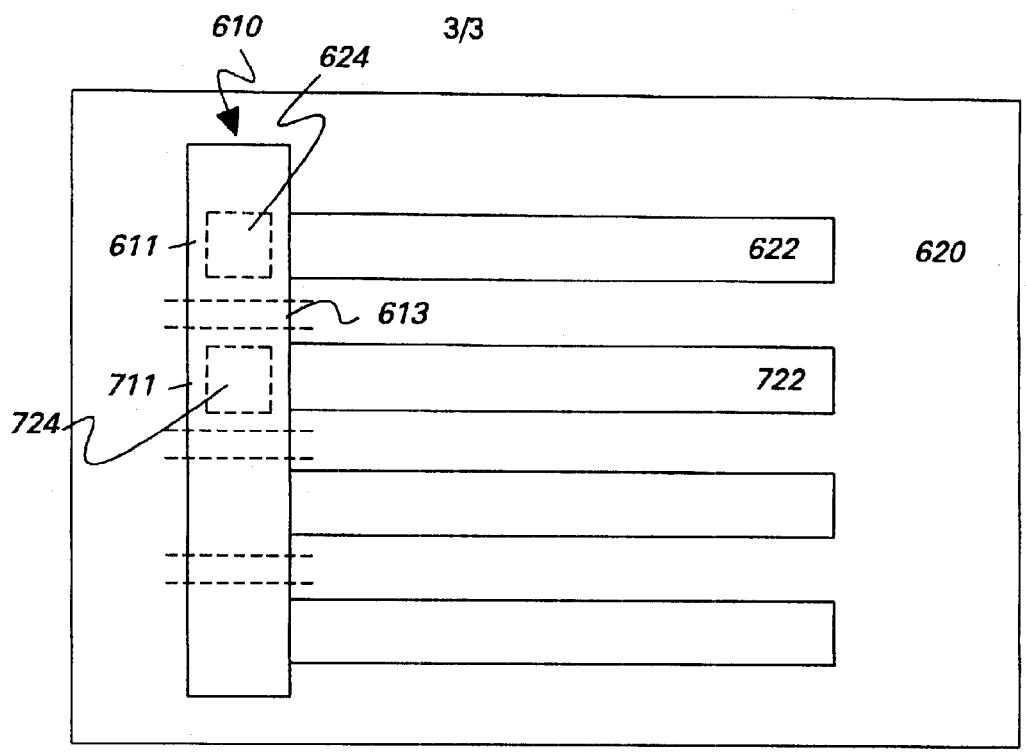
FIG. 7 is a top view of an optical coupling arrangement including multiple waveguides in accordance with another embodiment of the present invention.

FIG. 3 is a partially perspective and partially sectional view of an optical coupling arrangement using the FOP shown in FIG. 1 in accordance with a coupling embodiment of the present invention. The optical coupling arrangement of FIG. 3 comprises: a substrate 20 including a light element 24 (meaning at least one light element) and a wave guide 22 (meaning at least one wave guide) overlying the substrate with an FOP (meaning at least one FOP). In one embodiment wherein multiple waveguides are used, such as shown in FIG. 7, each waveguide has a corresponding light element. In such embodiments, pairs of waveguides and light elements may be used with respective individual FOPs or with a shared FOP. Regardless of the specific embodiment, the FOP is adapted to receive light through the first side surface, reflect the received light from third side surface 16, and transmit the reflected light through the second side surface. FOP 10 is situated such that one of the first and second side surfaces (first side surface 12 in FIG. 1, for example) is adjacent the light element and the other of the first and second side surfaces (second side surface 14 in FIG. 1, for example) is adjacent the wave guide. The term "overlying" is used herein for purposes of example, is not intended to limit the directional orientation of the coupling arrangement (in other words, the coupler could be turned upside down with respect to the orientation shown in FIG. 3, for example), and is intended to encompass embodiments wherein the wave guide is touching the substrate as well as embodiments wherein another material such as second substrate 320 of FIG. 5 is present between the substrate and the wave guide.

Figure 4:
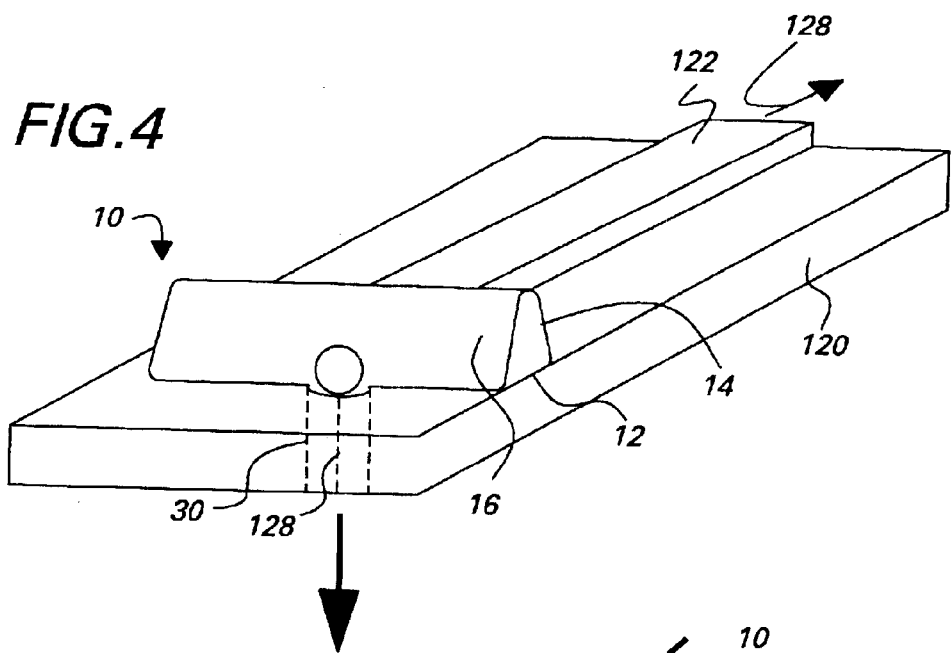
FIGS. 4–6 are perspective views of optical coupling arrangements according to other embodiments of the present invention.

Substrate 20 may comprise any structurally appropriate material including, for example, inorganic materials such as ceramics, organic materials such as polymers, or composite materials such as materials used for multi-chip modules (MCMs). Light element 24 may comprise a light emitting device such as a light emitting diode (LED) or a vertical cavity surface emitting laser (VCSEL), for example, or a light receiving device such as a photodiode, for example. Alternatively light element 24 may comprise, as shown in FIG. 4, a light path 30 comprising a wave guide, an FOP, an optical fiber, or an opening in the substrate through which light can pass, for example. Depending on the material of substrate 20 and the nature of light element 24, light element 24 may be inserted into a substrate cavity 26 of the substrate or alternatively light element 24 may be molded in the substrate during fabrication of the substrate.

Wave guide 22 may comprise any appropriate wave guide material. Conventional wave guide materials, for example, typically comprise flat plastic materials such as polymers. Wave guide 22 may be attached to the substrate by an adhesive (not shown), for example. In one embodiment, wave guide 22 is attached such that the substrate and wave guide form an angle of about ninety degrees to facilitate alignment of an FOP having substantially perpendicular (meaning 90 degrees plus or minus about 5 degrees, for example) first and second side surfaces. FOP 10 may likewise be attached to the substrate and the waveguide by an adhesive (not shown), for example. In one embodiment, the FOP-attaching adhesive comprises an index-matching adhesive.

With the optical coupling arrangement of FIG. 3, light 28 can either be (a) emitted from light element 24 and transmitted by FOP 10 to wave guide 22; or (b) transmitted from wave guide 22 through FOP 10 for receipt by light element 24.

Figure 6:
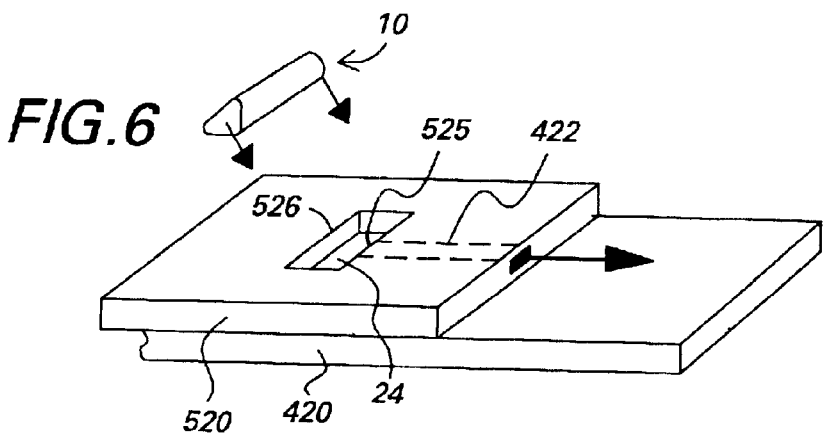

FIGS. 4–6 are perspective views of optical coupling arrangements according to other embodiments of the present invention. The embodiment of FIG. 4 is similar to that of FIG. 3 except that the light element comprises a light path 30 such as a wave guide, an FOP, an optical fiber, or an opening, for example. Again, light 128 may travel in either direction.

The embodiment of FIG. 5 is similar to that of FIGS. 3–4 except that a wave guide 222 is integral to a second substrate 320. In the example of FIG. 5, wave guide 222 is positioned to have an exterior surface 221 with respect to first and second substrates 220 and 320, and FOP 10 is situated such that one of the first and second side surfaces faces an outer edge 323 of the second substrate.

The embodiment of FIG. 6 is similar to that of FIG. 5 except that wave guide 422 is imbedded completely within a second substrate 520, and FOP 10 is situated such that one of the first and second side surfaces faces an inner edge 525 of the second substrate.

The substrates, wave guides, and FOPs of FIGS. 4–6 may comprise similar materials as those discussed with respect to FIG. 3. In the embodiment of FIG. 6, it is useful for second substrate 520 to comprise a laser ablatable material so that a substrate cavity 526 can be formed by laser ablation to expose desired portions of first substrate 420 and light element 24.

As stated above, an FOP means at least one FOP, and a wave guide means at least one wave guide. FIG. 7 is a top view of an example optical coupling arrangement including multiple waveguides 622 and 722 situated over substrate 620. The multiple waveguides may be individually positioned on substrate 620 or may be included in a second substrate (not shown) which is then applied to substrate 620 and aligned with light elements 624 and 724.

For ease of alignment, it is useful to situate a single FOP 610 across the substrate to receive light from the waveguides. To avoid cross-talk between the waveguides and respective light elements, FOP 610 can be cut to remove portions 613 and leave individual FOPs 611 and 711 intact. To further avoid cross-talk/light leakage between individual FOPs, gaps left by removed portions 613 can be filled with opaque material(not shown). The opaque material may comprise an opaque polymer or epoxy, for example.

Figure 8:
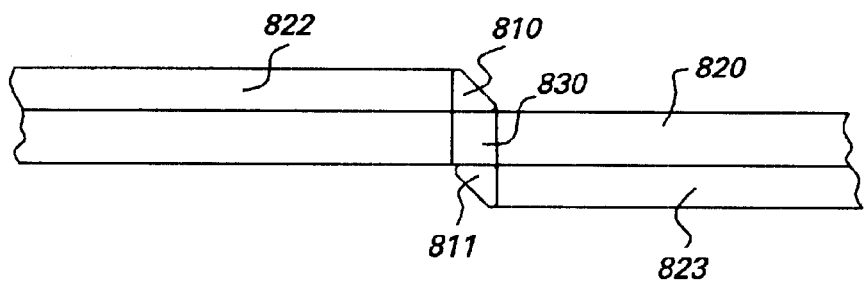
FIG. 8 is a sectional side view of an optical coupling arrangement in accordance with another embodiment of the present invention.

FIG. 8 is a sectional side view of an optical coupling arrangement in accordance with another embodiment of the present invention wherein the wave guide comprises a first wave guide 822, the FOP comprises a first FOP 810, and the light path 830 extends through the substrate 820. The embodiment of FIG. 8 further comprises a second wave guide 823 and a second FOP 811 with the second FOP being situated such that one of the first and second side surfaces of the second FOP is adjacent the light path and the other of the first and second side surfaces is adjacent the second wave guide.

Embodiments of the present invention can thus be used to provide reliable and inexpensive components for orthogonal coupling of wave guides to light elements in various combinations without major modifications of the underlying structure and without changing from planar to three-dimensional architecture.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An optical coupler comprising:
   a fiber optic prism (FOP) comprising first, second, and third side surfaces, the FOP being adapted to receive light through the first side surface, reflect the received light from the third side surface, and transmit the reflected light through the second side surface, the FOP having a height less than or equal to about 50 microns and a length sufficiently long for alignment to a substrate.

2. The coupler of claim 1 wherein the first and second side surfaces are substantially perpendicular.

3. The coupler of claim 2 wherein the first, second, and third side surfaces each comprise substantially flat surfaces.

4. The coupler of claim 2 wherein the first and second side surfaces each comprise substantially flat surfaces and the third side surface comprises a substantially curved surface.

5. The coupler of claim 1 wherein the height of the FOP ranges from about 2 microns to about 6 microns.

6. The coupler of claim 1 wherein the length of the FOP is at least about 1 kilometer.

7. An optical coupling arrangement comprising:
   (a) a substrate including a light element;
   (b) a wave guide overlying the substrate; and
   (c) a fiber optic prism (FOP) comprising first, second, and third side, surfaces, the FOP being adapted to receive light through the first side surface, reflect the received light from the third side surface, and transmit the reflected light through the second side surface, the FOP being situated such that one of the first and second side surfaces is adjacent the light element and the other of the first and second side surfaces is adjacent the wave guide.

8. The arrangement of claim 7 wherein the light element comprises a light device.

9. The arrangement of claim 7 wherein the light element comprises a light path.

10. The arrangement of claim 9 wherein the wave guide comprises a first wave guide, the FOP comprises a first FOP, and the light path extends through the substrate, and further comprising a second wave guide and a second FOP, the second FOP being situated such that one of the first and second side surfaces of the second FOP is adjacent the light path and the other of the first and second side surfaces of the second FOP is adjacent the second wave guide.

11. The arrangement of claim 7 wherein the substrate comprises a first substrate and further including a second substrate, the second substrate comprising the wave guide.

12. The arrangement of claim 11 wherein the FOP is situated such that one of the first and second side surfaces faces an outer edge of the second substrate.

13. The arrangement of claim 11 wherein the FOP is situated such that one of the first and second side surfaces faces an inner edge of the second substrate.

14. An optical coupling arrangement comprising:
   (a) a first substrate including a light element;
   (b) a second substrate overlying the first substrate and including a wave guide; and
   (c) a fiber optic prism (FOP) comprising first, second, and third side surfaces, the FOP being adapted to receive light through the first side surface, reflect the received light from the third side surface, and transmit the reflected light through the second side surface, the FOP being situated such that one of the first and second side surfaces is adjacent the light element and the other of the first and second side surfaces is adjacent the wave guide.

15. The arrangement of claim 14 wherein the light element comprises a light device.

16. The arrangement of claim 14 wherein the light element comprises a light path.

17. A method for fabricating an optical coupling arrangement comprising:
   (a) providing a substrate including a light element and a wave guide overlying the substrate; and
   (b) positioning a fiber optic prism (FOP) comprising first, second, and third side surfaces, the FOP being adapted to receive light through the first side surface, reflect the received light from the third side surface, and transmit the reflected light through the second side surface, such that one of the first and second side surfaces is adjacent the light element and the other of the first and second side surfaces is adjacent the wave guide.

18. The method of claim 17 wherein the light element includes a plurality of light elements and the wave guide includes a plurality of wave guides.

19. The method of claim 18 wherein positioning the FOP comprises positioning one fiber prism relative to a plurality of wave guides and respective light elements, and then removing portions of the one fiber prism to segment individual fiber prisms for respective wave guide and light element combinations.

20. The method of claim 17 the light element comprises a light path extending through the substrate, the wave guide comprises a first wave guide, and the FOP comprises a first FOP, and further comprising positioning a second wave guide and a second FOP such that one of the first and second side surfaces of the second FOP is adjacent the light path and the other of the first and second side surfaces of the second FOP is adjacent the second wave guide.

21. A method for fabricating an optical coupling arrangement comprising:

(a) aligning a fiber optic prism (FOP) on a substrate, the FOP comprising first, second, and third side surfaces and being adapted to receive light through the first side surface, reflect the received light from the third side surface, and transmit the reflected light through the second side surface, the first, second and third side surfaces having lengths longer than required for optical coupling; and (b) removing at least one extraneous portion of the FOP.

22. A method for fabricating an optical coupling arrangement comprising drawing a fiber optic prism (FOP) from a fiber fabrication apparatus, the FOP comprising first, second, and third side surfaces, the FOP being adapted to receive light through the first side surface, reflect the received light from the third side surface, and transmit the reflected light through the second side surface, the FOP having a height less than or equal to about 50 microns and a length of at least one kilometer.

* * * * *